Figure 1:
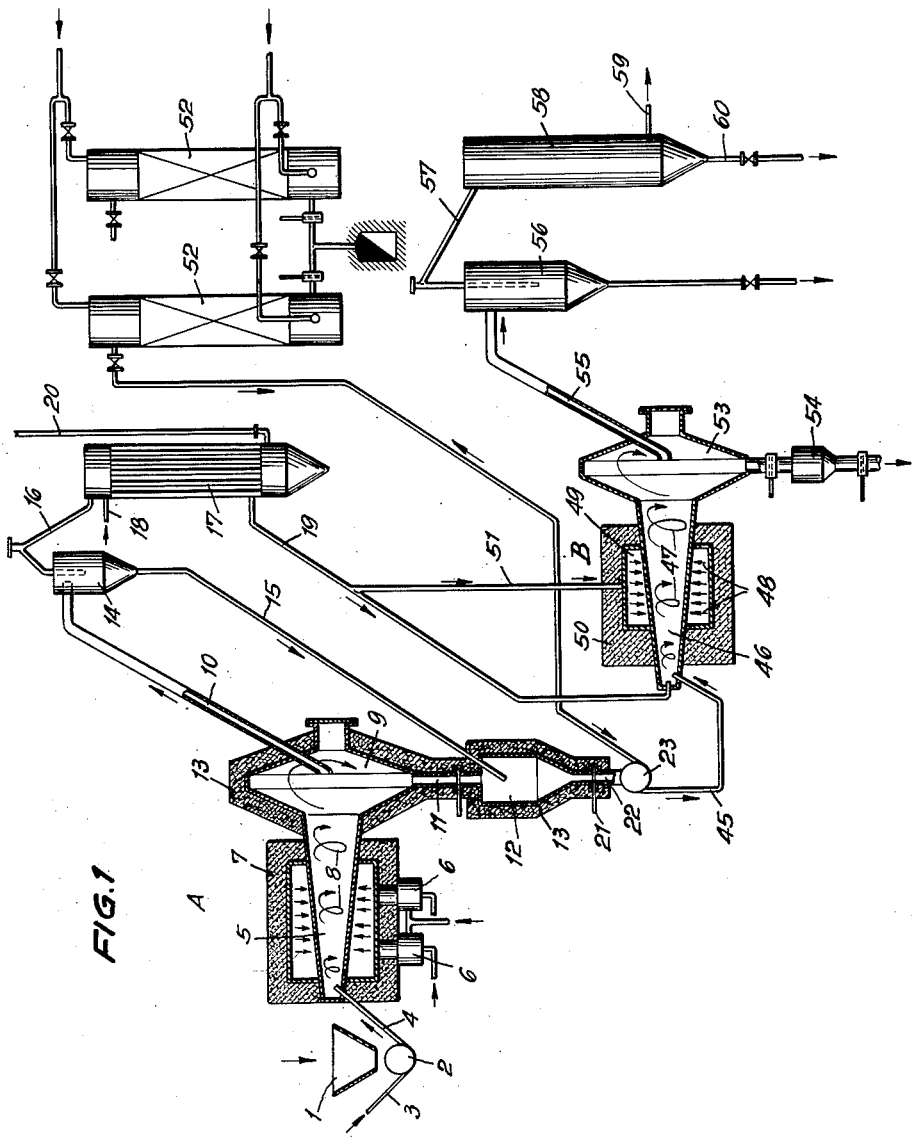

July 2, 1957  J. DANIELS ET AL  2,797,979
MANUFACTURE OF CYANAMIDES
Filed July 23, 1952  2 Sheets-Sheet 1

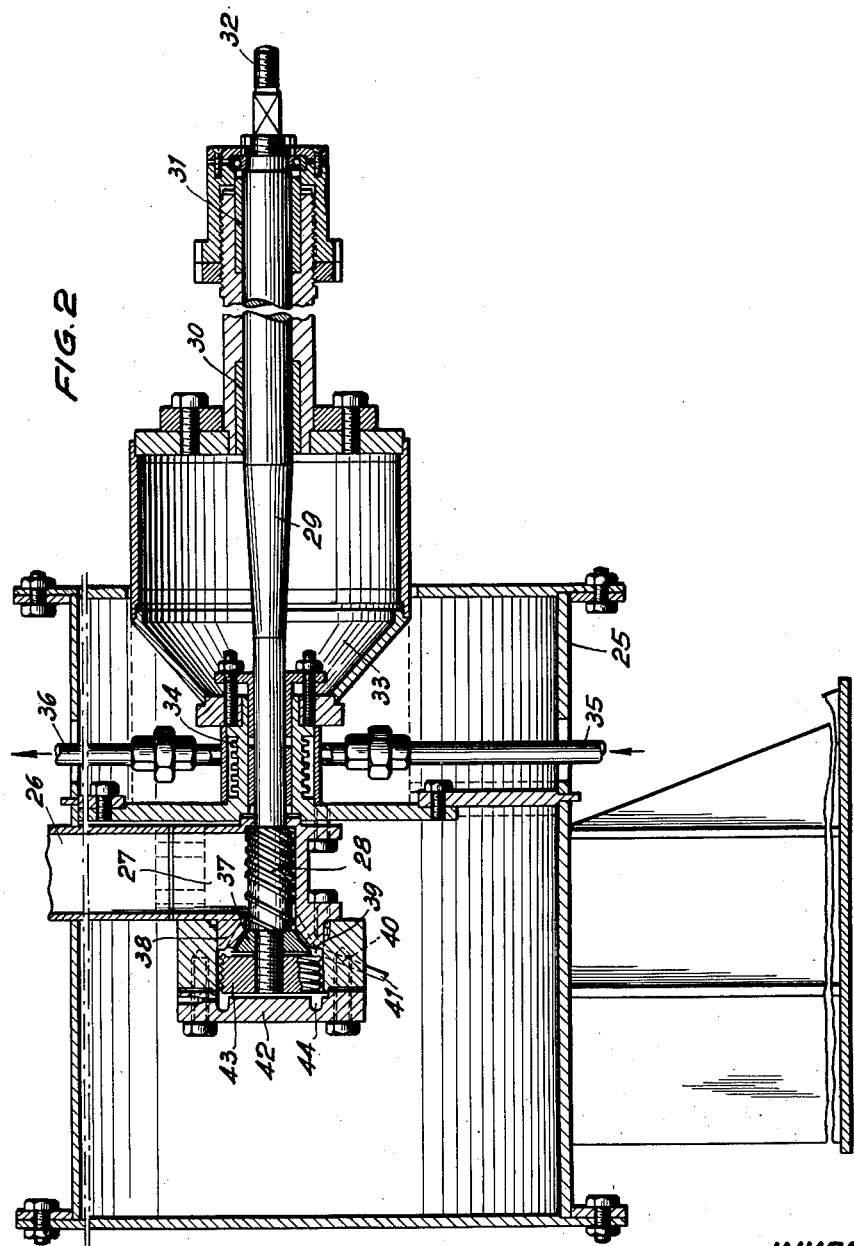

United States Patent Office 2,797,979
Patented July 2, 1957

2,797,979
MANUFACTURE OF CYANAMIDES

Joseph Daniels, Essen, Ermbrecht Rindtorff, Recklinghausen, and Wilhelm Ruschmann, Herne, Germany Application July 23, 1952, Serial No. 300,452

Claims priority, application Germany July 23, 1951

4 Claims. (Cl. 23—78)

This invention relates to the manufacture of cyanamides, particularly of the alkalis and alkaline earth metals, such as calcium cyanamide by the reaction of the corresponding oxides or the like with ammonia and carbon dioxide or carbon monoxide at elevated temperature according to the general equations:

$$Me_2O + CO_2 + 2NH_3 = Me_2CN_2 + 3H_2O$$
$$MeO + CO_2 + 2NH_3 = Me_2CN_2 + 3H_2O$$
$$Me_2O + 2CO + 2NH_3 = Me_2CN_2 + H_2O + 2H_2 + CO_2$$
$$MeO + 2CO + 2NH_3 = MeCN_2 + H_2O + 2H_2 + CO_2$$

in which Me is a corresponding uni- or bivalent metal.

The invention is suitable in particular for the manufacture of crude calcium cyanamide by the reaction of chalk dust with ammonia and of quicklime with ammonia and carbon dioxide or carbon monoxide according to the equations:

$$CaCO_3 + 2NH_3 = CaCN_2 + 3H_2O$$
$$CaO + CO_2 + 2NH_3 = CaCN_2 + 3H_2O$$
$$CaO + 2CO + 2NH_3 = CaCN_2 + H_2O + 2H_2 + CO_2$$

The chief difficulty in carrying out the aforesaid cyanamide processes is the prevention of decomposition or a substantial decomposition of the ammonia to be added to the reaction mixture. The reactions proceed best at temperatures above about 600° C. At this temperature however ammonia decomposes very considerably so that considerable losses of ammonia must be reckoned with.

The invention is based upon the basic idea of injecting into a reaction chamber the solid reaction constituents (CaO) at a high temperature lying above the reaction temperature, by means of a gaseous or vaporous carrier, such as a conveniently heated stream of hot carbon dioxide or carbon monoxide, in the form of a jet, so that the hot solid reaction constituents are distributed as uniformly as possible in the reaction chamber. Separately from the stream of the hot solid reaction material, or in some cases together therewith, ammonia gas is introduced into the reaction chamber, preferably at a temperature of about 500° C. or less, care being taken that the walls of the reaction chamber are not substantially hotter than the inlet temperature of the ammonia gas.

It is also possible and indeed preferable, to inject simultaneously with the hot dust reaction-accelerating catalysts, in the form of salts and/or oxides of the elements of the first or second group of the periodic system, or mixtures thereof. In the described process a particularly effective contact catalyst has been shown to be a mixed catalyst in the form of a commercial Kainite of the average composition:

30–40% $K_2SO_4$, 45–55% KCl, 5–15% $HgCl_2$

In adding the catalyst the finely ground catalyst may be admixed with the hot CaO, or the chalk may be soaked with the aqueous solution of the catalyst before decarbonisation.

In the process according to the invention the heat of the endothermic reaction is thus substantially covered by the sensible heat of the hot quicklime or other solid reaction constituent or by the sensible heat of the carrier gas which is injected with the hot lime. The lime comes into contact with the ammonia at a high temperature which however only arises in the gas layers directly adjacent the lime particles. The desired reaction takes place in these limiting layers, the reaction probably extending through the formation of prussic acid but in any case requiring a higher temperature than about 600° C., preferably one of 700° C. or more.

It is naturally unavoidable that a part of the ammonia gas which is not immediately reacted with lime and carbon dioxide is decomposed into permanent gases. The losses of ammonia thereby involved are however considerably smaller than would be produced if the reaction heat was supplied for example through the walls of the reaction chamber, such as by means of heating passages provided in the reaction chamber walls.

The cyanamide formed in the process, e. g. calcium cyanamide is obtained in substantially in the same particle size as the quicklime or the like exhibited upon entry into the reaction chamber. A subsequent disintegration of the calcium cyanamide or the like is not, as a rule, necessary.

The dimensions of the reaction chamber are, in conformity with the shape and speed of the jet of carrier gas with quicklime, so chosen that all parts remain in suspension at least so long as a baking together is still possible in the temperature range of the plastic state. In this way a sufficient enrichment of the solids in cyanamide is obtained without resulting in an agglomeration which would render subsequent grinding necessary.

Apart from the decrease in the decomposition of $NH_3$ in the process according to the invention it is advantageous to use for the walls of the reaction chamber a material which does not accelerate or support the decomposition of the ammonia into permanent gases. Materials containing aluminium oxide are as a rule not suitable so that the invention preferably provides silicic acid for the formation of the inner surfaces of the reaction chamber, e. g. in the form of fused quartz.

It is of substantial importance for the process according to the invention that the solid reactants i. e. the quicklime are injected at high temperature and in a state of fine division. The invention preferably employs for this purpose a pulverising device which has a worm of heat resistant material, such as steel containing titanium, and a grinding device constructed in the manner of a mill and arranged at the end of the worm, the rotor thereof being mounted at the free end of the floating worm shaft and its fixed grinding disc (stator) being formed by a closed housing part so that stuffing-box-like extensions are avoided at all points at which hot materials are to be treated. At the periphery of the grinding apparatus, which for practical purposes does not effect any division of the granules but merely breaks up agglomerations which may occur, there is provided an annular passage into which the carrier gas is injected through substantially tangentially opening nozzles, the carrier gas engaging and entraining the solid material issuing at the periphery of the grinding device in a finely divided condition.

In some cases it is possible to utilise this annular passage as a reaction chamber for the formation of calcium cyanamide. However, the resulting mixture of carrier gas and solid material therein may be further conveyed through a closed short pipe and introduced into a separate reaction chamber of substantially spherical shape, to which the ammonia gas is also supplied.

An essential characteristic of the invention in relation to the construction of the grinding device for the lime at high temperature consists in introducing into the gap between the rotor of the grinding device and the fixed housing, a gas, which may be part of the stream of carrier gas, so that a uniform flow of gas is maintained in the direction of the periphery of the rotating grinding disc. Through this feature finely divided solid is prevented from lodging in this gap and giving rise to possible interruptions in operations.

On the accompanying drawing there is shown diagrammatically in Fig. 1 an apparatus for carrying out the process according to the invention, whilst Fig. 2 is a section through the grinding and injecting device for the hot lime.

The installation shown in Fig. 1 consists chiefly of the two systems A and B, of which the system A serves to convert carbonate of lime continuously into quicklime at high temperature and in finely divided form, whilst in system B the conversion of the hot quicklime into calcium cyanamide is effected.

The finely divided carbonate of lime passes first of all into a supply container 1 at the base of which there is provided an injection device 2, for example of the kind shown in Fig. 2, and in which the chalk is received in the form of an homogeneous mixture of chalk and air, by compressed air from the pipe 3. The chalk-air mixture passes through the pipe 4 into a reaction chamber 5 which is heated externally by a burner 6 and is arranged in a housing 7 of refractory material. By a suitable arrangement of the inlet pipe 4 there is obtained in the chamber or retort 5 a helical movement of gas, as indicated by the arrows 8. On account of this particular movement of gas the finely divided chalk passes along the walls of the reaction chamber 5 and thereby receives heat. By suitable adjustment of the burner 6 it can be ensured that at the end of the reaction chamber 5 the chalk is practically free of carbon dioxide and water.

The mixture then passes into a dust separation chamber 9 from which the carrier gas (air) freed from the majority of the lime is drawn off through the pipe 10, whilst the separated lime passes through the base opening 11 into a supply container or intermediate bunker 12.

The dust separator 9 and the supply container 12 are provided with suitable heat insulation 13 so that the material undergoes no substantial cooling therein.

The gaseous medium, still containing lime, drawn off through the pipe 10 is freed from the entrained solids in the pipe 14, likewise insulated against heat, the solids passing through the pipe 15 to the supply container 12. The dust-free gas passes through the pipe 16 to a heat exchanger 17 in which its sensible heat is used to preheat ammonia gas, which enters through the pipe 18 and passes out through pipe 19 in a preheated condition, at a temperature of about 400–500° C., for further use. The cooled waste gas escapes through the pipe 20.

The fine lime dust accumulating in the supply container 12, and whose temperature may amount to about 1000° C. or more, passes through the base opening, controlled by a cut-off valve 21, to an injection device 23 which is shown in detail in Fig. 2 and will now be described in more detail.

The injection device according to Fig. 2 has a closed housing 25 to which is connected the pipe 26, coming from the top of the supply container 12, and to which the finely divided hot lime is supplied.

The pipe 26 ends in a hopper 27 in which is arranged a conveyor worm 28 which is arranged at the end of a shaft 29, floatingly supported at 30 and 31, which is driven at the outwardly extending shaft stub 32, as by a motor through a variable gear (not shown).

The shaft 29 extends through a stuffing-box-like part 33 which is provided with a cooling casing 34 to which is supplied a suitable cooling fluid, for example cold water, through pipe 35, whilst the warm waste water runs away through the pipe 36.

From the conveyor worm 28 the material (hot burnt lime) in the delivery hopper 27 is supplied to a grinding device, adjoining the worm 28, which consists of a rotating grinding member 37 non-rotatably connected with the shaft 29, and a fixed grinding member 38. This grinding device serves to finely divide the solid and remove any agglomerations which may occur. No substantial division of the granules need however take place in the grinding device 37, 38. At the periphery of the grinding device 37, 38 there is provided an annular passage 39 into which several nozzles 40 open tangentially, each being connected with a supply pipe 41 for a suitable carrier gas such as carbon dioxide or carbon monoxide with a temperature of, preferably, 400–500° C. and in some cases a higher temperature.

The finely divided material issuing from the grinding device 37, 38 is engaged by the circulating gas stream in the annular passage 39 and is moved on in the form of a practically homogeneous mixture.

The working chamber of the worm 28 and the rotating grinding disc 37 is closed externally by a cover 42. It is preferable also to provide at the end of the shaft 29 a packing body 43, the periphery of which is provided with grooves, which form a kind of labyrinth packing.

In the cover 42 there is formed an annular passage 44 which opens towards the packing body 43 and which serves to supply a suitable gas, such as part of the stream of the carrier gas, continuously through the labyrinth packing or its preferably helically formed passages. In this way solids are prevented from entering into the gap between the rotating grinding body 37 and the fixed housing or into the labyrinth packing which is limited by the packing body 43.

From the annular passage 39 the homogeneous mixture of solid and gas is led away in a suitable manner, for example through the pipe shown at 45 in Fig. 1.

The pipe 45 leads to the reaction chamber 46 of the system B. Into this reaction chamber ammonia gas is simultaneously introduced with a temperature of about 400° C. through the pipe 19.

In the reaction chamber 46, in the same way as in the reaction chamber 5 of system A a helical movement of the gas is created, as indicated by the arrow 47. Through this movement a favourable admixture of the solid-carrier-gas mixture with the ammonia gas is achieved and thus the extensive progress of the reaction is assured.

The reaction chamber 46 may have wall openings in order to introduce ammonia gas therein from outside, as shown by the arrow 48. For this purpose the reaction chamber 46 is enclosed by a hollow space formed in the brickwork 50. Into this hollow space 49 ammonia gas at a suitable temperature can be introduced through the branch pipe 51.

The carrier gas serving to inject the hot lime (carbon dioxide or carbon monoxide) is for example preheated in regenerative heaters 52 which are used alternatively for heating, whilst the other heater is heated by means of hot combustion gases. The hot carrier gas is injected into the heater 52 which is at the time serving for heating, with the pressure which is necessary in the injection device 22 for producing a stream of gas carrying the solid. The gas may be heated in the heaters 52 to a temperature which corresponds approximately to that of the lime in the container 12. However it is in some circumstances advantageous to select a lower temperature in order to prevent the reaction temperature in the chamber 46 from being too hot and in order to prevent or decrease decomposition of ammonia. In some circumstances it may be advantageous to add to the carrier gas a certain quantity of ammonia. In this case the supply of ammonia through the pipe 19 is correspondingly decreased or interrupted.

Connected to the reaction chamber 46 is a separator 53 in which the majority of the calcium cyanamide produced separates. The separated material is collected in the supply container 54. The gas mixture still containing dust passes through the pipe 55 to a dust separator 56 in which is separated the remainder of the entrained calcium cyanamide.

The residual gas which as a rule still contains substantial quantities of ammonia, passes through the pipe 57 and goes for example into a cooler 58 in which the water resulting from the reaction is precipitated. The residual gas which can escape at 59, if it still contains substantial quantities of ammonia, is again led back in circulation in the system B, if necessary after suitable enrichment with further quantities of ammonia.

The condensate accumulating in the cooler 58 is taken away through the pipe 60 and supplied for further use.

In some circumstances it is advantageous to omit the pipe 45 between the injection device and the reaction chamber 47, i. e. to allow the injection device to open directly into the reaction chamber. In this case the relatively cold ammonia gas can be used as the carrier gas for the hot solid reaction ingredients, i. e. blow these out from the reaction chamber with ammonia gas, if necessary in combination or admixture with other gases such as for example carbonaceous gases.

We claim:

1. In the process of manufacturing a metal cyanamide, said metal being a member of the group consisting of the alkali and alkaline earth metals, by reaction between said metal in the form of an oxide thereof with a material selected from the group consisting of carbon monoxide, carbon dioxide and mixtures thereof and ammonia at a temperature above 600° C., the improvement which comprises injecting said oxide as a suspension in a carrier gas selected from the reactants consisting of carbon monoxide, carbon dioxide, and mixtures thereof, into a reaction chamber in a finely divided condition at a temperature substantially above the reaction temperature to distribute said oxide within said reaction chamber, and simultaneously introducing ammonia gas into said reaction chamber at a temperature about 500° C.

2. A process as recited in claim 1 in which the suspension of said oxide in said carrier gas is injected into said reaction chamber in a manner, so as to provide a helical movement thereof from one end of the chamber to the other end.

3. A process as recited in claim 1 in which the temperature of the walls of the reaction chamber are maintained at a temperature which is not substantially hotter than the inlet temperature of the ammonia gas.

4. A process as recited in claim 1 in which a catalyst is injected into the reaction chamber together with the said oxides.

References Cited in the file of this patent

UNITED STATES PATENTS

| | | |
|---|---|---|
| 1,139,790 | Millar | May 18, 1915 |
| 1,230,343 | Tommasi | June 19, 1917 |
| 1,256,935 | Sem | Feb. 19, 1918 |
| 1,992,289 | Caro et al. | Feb. 26, 1935 |
| 2,413,469 | Schweitzer | Dec. 31, 1946 |
| 2,463,843 | Wright | Mar. 8, 1949 |
| 2,542,482 | Cully | Feb. 20, 1951 |

FOREIGN PATENTS

| | | |
|---|---|---|
| 358,276 | Great Britain | Oct. 8, 1931 |
| 364,225 | Great Britain | Jan. 7, 1932 |
| 672,570 | Great Britain | May 21, 1952 |